United States Patent
Herrmann (10) Patent No.: US 10,102,456 B2
(45) Date of Patent: Oct. 16, 2018

(54) SYSTEMS AND METHODS FOR IMPLEMENTING SELECTABLE INPUT MEDIA ROUTING OF MULTIPLE INPUT MEDIA FORMS FROM MULTIPLE AXES IN IMAGE FORMING DEVICES

(71) Applicant: XEROX Corporation, Norwalk, CT (US)

(72) Inventor: Douglas K. Herrmann, Webster, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 15/143,432

(22) Filed: Apr. 29, 2016

(65) Prior Publication Data

US 2017/0313537 A1    Nov. 2, 2017

(51) Int. Cl.

| | |
|---|---|
| *G06K 15/02* | (2006.01) |
| *B41J 15/22* | (2006.01) |
| *B41J 15/00* | (2006.01) |
| *G06K 15/16* | (2006.01) |
| *G03G 15/00* | (2006.01) |
| *B41J 15/04* | (2006.01) |
| *B65H 39/02* | (2006.01) |
| *B65H 15/00* | (2006.01) |
| *G06K 15/00* | (2006.01) |
| *B65H 5/26* | (2006.01) |
| *B65H 23/32* | (2006.01) |
| *B65H 20/00* | (2006.01) |

(52) U.S. Cl.
CPC ......... *G06K 15/022* (2013.01); *B41J 15/046* (2013.01); *B41J 15/22* (2013.01); *B65H 15/00* (2013.01); *B65H 39/02* (2013.01); *G03G 15/00* (2013.01); *G06K 15/16* (2013.01); *B65H 5/26* (2013.01); *B65H 20/00* (2013.01); *B65H 23/32* (2013.01); *B65H 2301/33212* (2013.01); *B65H 2404/2611* (2013.01); *G06K 15/4065* (2013.01)

(58) Field of Classification Search
None
See application file for complete search history.

(56) References Cited

U.S. PATENT DOCUMENTS

| | | | | |
|---|---|---|---|---|
| 4,256,248 A | * | 3/1981 | Lapp ................... | B41J 11/58 226/1 |
| 4,790,126 A | * | 12/1988 | Boeckmann .......... | B29C 66/344 226/196.1 |
| 4,879,571 A | * | 11/1989 | Plasscheart ........... | B65H 15/00 271/186 |

(Continued)

*Primary Examiner* — Miya J Williams
(74) *Attorney, Agent, or Firm* — Caesar Rivise, PC (57) ABSTRACT

Systems and methods are provided for configuring media transport flow paths for directing input image receiving media, including of different types, in sheet or roll form from multiple axes to provide wider latitude in selecting particular input image receiving media and combinations of input image receiving media to support execution of a print job. The disclosed schemes are directed at using one or more stationary turn bars disposed generally at 45° in an input media transport path approaching a marking module in an image forming system to allow for sheets or sheeted materials to be positioned at 90° to the in-line input image receiving media transport path directed toward the marking module thus allowing for flexibility in selection among various sources of stacked, pallet and rolled media.

21 Claims, 7 Drawing Sheets

(56) References Cited

U.S. PATENT DOCUMENTS

| | | | | |
|---|---|---|---|---|
| 5,439,208 | A * | 8/1995 | Moser | B65H 15/00 |
| | | | | 271/182 |
| 6,227,532 | B1 * | 5/2001 | Bakoledis | B65H 15/00 |
| | | | | 198/403 |
| 7,021,184 | B2 * | 4/2006 | Sussmeier | B26D 9/00 |
| | | | | 270/52.02 |
| 2003/0167943 | A1 * | 9/2003 | Izawa | B41F 13/06 |
| | | | | 101/223 |
| 2006/0291018 | A1 * | 12/2006 | Lang | B41J 3/42 |
| | | | | 358/540 |
| 2011/0243634 | A1 * | 10/2011 | Kagami | B41J 3/543 |
| | | | | 400/582 |
| 2012/0112404 | A1 * | 5/2012 | Ponti | B65H 39/06 |
| | | | | 271/226 |
| 2015/0239699 | A1 * | 8/2015 | Cornell | B65H 23/24 |
| | | | | 242/615.11 |
| 2016/0347088 | A1 * | 12/2016 | Herrmann | B41J 11/0015 |

* cited by examiner

SYSTEMS AND METHODS FOR IMPLEMENTING SELECTABLE INPUT MEDIA ROUTING OF MULTIPLE INPUT MEDIA FORMS FROM MULTIPLE AXES IN IMAGE FORMING DEVICES

BACKGROUND

This application is related to U.S. patent application Ser. No. 14/727,007, entitled "MODULAR MEDIA ROUTING SYSTEM FOR MULTI-FINISHER PRINTERS," filed in the U.S. Patent and Trademark Office on Jun. 1, 2015, and co-owned with this application, the disclosure of which is hereby incorporated by reference herein in its entirety.

1. Field of the Disclosed Embodiments

This disclosure relates to systems and methods for implementing schemes and configuring media transport flow paths for directing input image receiving media in sheet or roll form from multiple axes and according differing input image receiving media substrate types to provide wider latitude in selecting particular input image receiving media and combinations of input image receiving media, and interleaving different input image receiving media in a particular image forming operation or print job in an image forming device, including providing an apparatus and a flow path for directing the input image receiving media substrates from varied media inputs to a marking engine.

2. Related Art

Commercial printers, desktop publishers and other end users are increasingly intent on being provided increasing latitude in the selection of input image receiving media substrates in their presentation to a particular marking engine, even in the context of a single image forming operation or print job. Print job instructions include selection of a particular image receiving medium, or combination of image receiving media, on which the images of the individual pages comprising the print job are to be formed. Users that are generating the print jobs simply expect the supply of multiple and different image receiving media to be there on demand. The print job generators rarely concern themselves with ensuring that particularly-requested input media to support their particular requested operation are available. The availability of the media in the image forming system is generally simply presumed. As the sophistication in complex image forming systems, and their capabilities to produce print jobs on a multiplicity of image receiving media increase, certain real-world constraints have arisen that impede a capacity by which individual print jobs can be supported for production of text and images on a full spectrum of input image receiving media.

Consider that in certain material marking, printer, or image forming systems it may be desirable for a particular user population employing the individual image forming systems to have the option of selecting among a broad spectrum of input image receiving media hosted on multiple feeding and/or input system components. In order to support user-requested or other operational flexibility, marking engine manufacturers may want to provide a capacity by which individual marking engines have a capacity to support image receiving media fed from multiple input media feeding units, which those individual marking engine manufacturers may or may not also manufacture.

In certain image forming systems, multiple stacked-input image receiving media trays may be provided by which some number of differentiable image receiving media inputs can be provided. These image forming systems must generally be fitted with some manner of a bypass system in the input image receiving media transport (or flow) path to provide some capacity by which to manually customize the combination of image receiving media substrates presented as parts of a particular print job to the single input of the media marking engine. For the image forming systems that include such bypass capabilities, their use is still somewhat limited, and generally requires manual intervention to effect the multiplicity of different image receiving media inputs to support a particular print job. As such, the production of such systems is equally limited. For systems that do not include a bypass capability, there is generally no capacity by which to support the ability to have additional input or multiple image receiving media substrate input options to the marking module in the system.

Conventionally, feeding systems are configured to include singly, separately and exclusively one of cut sheet tray feeders, pallet feeders and rolled web-type feeders, the latter typically including one or more sheeter systems upstream of the marking engine in the input image receiving media flow path to render the individual cut sheets from the rolled media. Increasingly sophisticated customer requirements, however, supported by a single image forming system, including a particular marking engine, may wish to select more than one of these feeders even as part of a same print job, or may choose to flex between feeders for back-to-back print jobs. This desire leads to a need that a particular image forming system be configured to be able to select, in an automated manner, incoming input image receiving media from any one or more of a desired combination of differently-configured feeding equipment.

What appears to be a simple desire on the part of the customer users is generally difficult to implement with current systems, particularly those in which no manner of integrated bypass routes are available. It should be noted generally that roll feed systems do not have, and cannot generally accommodate, bypass systems. Additionally, even when bypass systems are provided in the input image receiving media flow paths of cut sheet image forming systems, the limited option for use is generally to provide bypass components in an inline configuration which may generally, and often unacceptably, lengthen the footprint of the image forming systems.

Also, conventional attempts to interleave the input image receiving media are generally limited by the need to pause the flow of one (principal) input image receiving media type to accommodate a space in the print job in which another (secondary) input image receiving media type may be inserted. These manual manipulations generally require that a particular user generating an image forming operation or print job be available at the image forming system to implement the correct input or placement of the particularly-selected input image receiving media to be interleaved in the print job in order to ensure that the print job is completed in the manner intended. Additionally, any requirement to pause a print job to, for example, change between specified and different image receiving media substrates within the print job will significantly affect the page-per-minute (ppm) capacity of the image forming device. When a complex image forming system within a particular organization is employed by numerous users, these delays may quickly become unacceptable across the user population being supported by the particular complex image forming.

SUMMARY

As is generally outlined above, multi-substrate stacked feeders exist, but it is generally impractical to mix stacked feeders (even with included bypass capabilities in a particular input image receiving media flow path) with rolled sheet feeders. It would, therefore, be advantageous to expand the latitude of image receiving media material inputs for any particular image forming device, image forming system, or marking engine. For example, general sheet feeding could be from one or more rolled sheet devices, while individual materials, which may be, for example, partially pre-printed, could be left in stacked sheet feeders for in-line feed. The roll fed material could be sheeted for use in a cut sheet machine, and varying substrates could be interleaved.

It would be advantageous to provide some manner by which to accommodate a number of different substrate inputs, regardless of the form in which the input image receiving media substrates are presented, particularly, for example, in situations in which stacked cassettes of individually-selectable sheeted substrate material may be considered impractical for any one of a number of reasons, and to overcome the substantial impracticality of providing multiple roll fed substrate materials in an in-line sheet feed device.

Exemplary embodiments of the systems and methods according to this disclosure may provide an operational capacity by which to accommodate separate or multiple rolled substrate feed path inputs.

Exemplary embodiments may obviate the real-world impracticality of stacking multiple and different rolled substrate inputs, for example, one on top of another.

Exemplary embodiments may provide a capacity by which to bypass a single roll feed in the rolled web media input.

Exemplary embodiments may make use of one or more stationary turn bars disposed generally at 45° in an input media transport path approaching a marking module in an image forming system to allow for sheets or sheeted materials to be positioned at 90° to the in-line input image receiving media transport path directed toward the marking module. In embodiments, these turn bars are stationary (non-rotating) structures positioned at a 45° angle about which a particular input image receiving media substrate may be turned 90° and flipped 180° for presentation to the in-line transport path.

Exemplary embodiments may employ physical configurations that expand on current right angle transfer (RAT) systems that are generally usable only to change the orientation of a sheet of input image receiving media substrate from portrait to landscape or from landscape to portrait for any image forming system that is at a right angle to the principal input image receiving media substrate flow (or printer) path.

Exemplary embodiments may provide flexibility in the positioning of sources of input image receiving media for increasingly large and complex image forming systems, and for office environments where a physical footprint for a complex image forming system is comparatively constrained. In embodiments, such a capacity may aid a particular customer in optimizing and/or limiting the significant physical footprint of the complex image forming system in a manner that allows for certain customized installations within a particular office operating environment.

Exemplary embodiments may implement schemes by which, for example, three or more separate roll feeds, with three or more separate media, may be appropriately separated from one another, by which rolled media could be fed to a cutter, a sheeter to sheet it, and then to have it directed to the input of the marking engine by being properly, necessarily or appropriately re-routed, around a turn bar for integration into an image transport path that may be a generally in-line input for the media marking device.

In embodiments, a customer may be provided an opportunity to have multiple roll feed inputs where such a capability does not exist today based on the fact that a bypass for the rolled substrate material is impractical to provide.

Exemplary embodiments may provide the flexibility by which a user could, for example, feed different sheets from different inputs in an interleaved manner.

Exemplary embodiments may provide the opportunity for feeding additional and/or different sheets to an in-line conveyor system. In embodiments, sheets may be from different orientations and may be appropriately re-oriented for proper presentation in the in-line conveyor system by being manipulated around one or more turn bars appropriately positioned with respect to the in-line conveyor system.

Exemplary embodiments may provide, for example, two conveyor belts routed around one or more turn bars, the conveyor belts being usable to sandwich the sheet around the turn bar in addition to having the sheet be held between the belt and the non-rotating turn bar. In embodiments, the sandwiching belt system may be provided as only a portion of the conveyor system and/or may be provided in a guide track that may be usable to keep the belts aligned.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for implementing schemes and configuring media transport flow paths for directing input image receiving media in sheet or roll form from multiple axes, and according differing input image receiving media substrate types to provide wider latitude in selecting particular input image receiving media for a marking engine, including providing an apparatus and a flow path for directing the input image receiving media substrates from varied media inputs to the marking engine, will be described, in detail, with reference to the following drawings, in which.

DETAILED DESCRIPTION OF EMBODIMENTS

The systems and methods for implementing schemes and configuring media transport flow paths for directing input image receiving media in sheet or roll form from multiple axes and according to differing input image receiving media substrate types to provide wider latitude in selecting particular input image receiving media and combinations of input image receiving media, and interleaving different input image receiving media in a particular image forming operation or print job in an image forming device, including providing an apparatus and a flow path for directing the input image receiving media substrates from varied media inputs to a marking engine according to this disclosure will generally refer to these specific utilities for those systems and methods. Exemplary embodiments described and depicted in this disclosure should not be interpreted as being specifically limited to any particular configuration of a media marking engine, any components including fusers or finishers located downstream of a media marking engine in a process direction, or any overall image forming device or system, or any particular configuration of control and/or processing components for controlling image forming operations by a marking engine or in an image forming device or system. It should be recognized that any advantageous use of the disclosed schemes for physically transporting input image receiving media from multiple input image receiving media sources to an input of a marking engine in an image forming device is contemplated as being encompassed by this disclosure, and as being included within the scope of the disclosed exemplary systems and methods.

The disclosed systems, devices, methods, processes, techniques and/or schemes introduce modules that allow multiple feeding systems (feeders) to be attached to a high speed printer, particularly for redirecting sheets of input image receiving media from the multiple feeders to the marking engine in the printer. The disclosed schemes are centered around input image receiving media flow paths that include one or more 45° angled stationary rollers to redirect the sheets of image receiving media via the chosen feeder path. In this manner, the disclosed schemes can select and divert the input image receiving media substrates on a sheet by sheet basis from several upstream feeders without the need to control and move each sheet while resetting for the next sheet. In embodiments, the disclosed modules may be individual separate units that are arranged to provide for a common output from the multiple inputs to the printer, and may include a bypass to cause sheets to bypass portions of the input image receiving media flow paths of to be redirected to any number of additional routing modules. Because the individual sheets of image receiving media are caused to move through a 90° turn by each 45° turn bar, each individual sheet may continue to be directed to a path without the need to rotate, stop, or reverse direction thus allowing for the overall input image receiving media substrate system speed by which input image receiving media substrates are fed to the marking engine to continue to increase as printer speeds increase. In embodiments, the disclosed systems allow sheets to be fed from multiple feeders to an input of the media marking engine in the printer with no change in sheet orientation. An optional registration unit may be included when needed.

In the above generally-described manner, the disclosed schemes have, among other operating objectives, a capacity to overcome the shortfalls in currently-available input image receiving media sheet feeder technology, which tends to be limited to a multiplicity of inline feeder/feeders. According to the disclosed schemes, users may be provided access to several feeders, including combinations of in-line feeders, pallet feeders or roll feed systems. This access broadens the latitude provided to the users in selection of multiple input image receiving media substrates, even in the context of a single print job. The disclosed schemes may create a printer system capable of accommodating multiple feeders on a job-by-job, or sheet-by-sheet basis, a capability which is generally unavailable today due to the need to bypass feeders without bypass capability.

The disclosed schemes may provide multiple feeders for feeding incoming sheets at high speed from each of the multiple feeders to an input of the media marking engine in an image forming system without a skipped pitch, and according to 90° changes in direction without changing from LEF (Long Edge Feed-Landscape) to SEF (Short Edge Feed-Portrait), and thus without conventional Right Angle Transfer (RAT) that would force a change from LEF to SEF or SEF to LEF. The disclosed schemes particularly address a capacity by which to change a direction of the input image receiving media substrates at speed and with minimal intercopy gap. Those of skill in the art recognize that mechanical systems that acquire a sheet and that may have any capacity to redirect the sheet from multiple input routes typically require high acceleration and deceleration profiles and further typically encounter both inertia and mechanical/electrical reaction time constraints arising from small intercopy gaps and paper speeds of high speed printers. The disclosed schemes, and the systems which implement those schemes, substantially eliminate these concerns by redirecting the individual sheets, not in an intermittent motion but in a continuous motion, where the LE of the sheet remains the LE after it has been redirected. This is accomplished according to the disclosed concepts by using a configuration of input image receiving media flow paths that incorporate at least one stationary roll (and potentially belt) system that has a 45° angle roll that then produces a 90° angle turn of the cut sheet media—keeping the LE the same. In this manner, as is described in greater detail below, multiple input image receiving media flow paths may be selected by employment of, for example, a diverter gate in the intercopy gap. The individual paths may direct the individual cut sheets from each of a right turn path, a left turn path and a bypass path on a sheet-by-sheet basis.

In embodiments, multiple modules may be interconnected to provide an additional feeding capacity or to accommodate physical and system layout requirements. The multiple modules may be configured with 1 or 2 turns to provide multiply-configured paths by which to provide inputs of image receiving media substrates to a single input port in the media marking engine of the printing system.

Exemplary embodiments may provide the flexibility by which a user could, for example, feed different sheets from different inputs in an interleaved manner. Exemplary embodiments may provide the opportunity for feeding additional and/or different sheets to an in-line conveyor system. In embodiments, sheets may be from different orientations and may be appropriately re-oriented for proper presentation in the in-line conveyor system by being manipulated around one or more turn bars appropriately positioned with respect to the in-line conveyor system. It should be noted that the turn bars are, in fact, stationary and it is the sheets that turn around the appropriately-oriented stationary turn bars.

Rolled media is generally fed off the top of the roll, but it could be fed off the bottom of the roll, as may be required to accommodate the presentation to the marking engine. Separately, additional turn bars, or other conventional inverters could be placed in the paper path of the in-line transport system to modify the presentation (side 1, side 2) of the substrate to the marking engine. Pallet feeders, like role feeders, may be among the various input sources.

In embodiments, a pair of opposing belts may be usable to sandwich the sheets individually as they are translated through portions of the input image receiving media flow paths, and particularly as they are translated around the turn bars. In embodiments, individual sheets would be held between the belts to provide smooth transition and translation around, for example, the non-rotating turn bars. For precision in a mechanical alignment, the sandwiching belt system may ride in a track of sorts, or guides may be provided, to keep the belts aligned.

Figure 1:
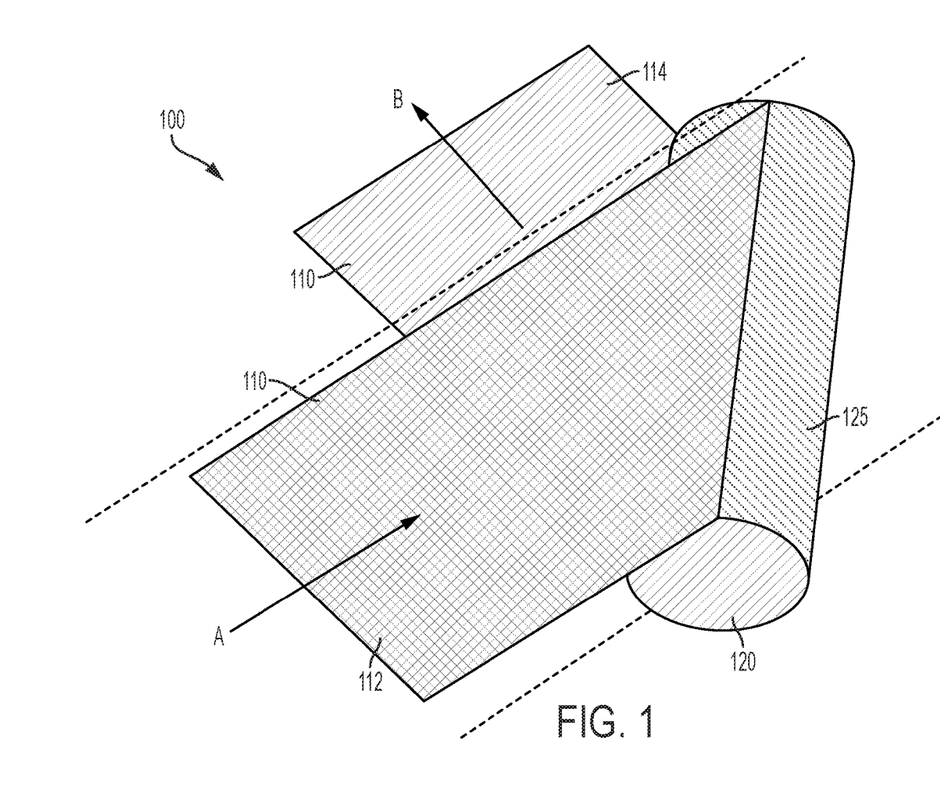
FIG. 1 illustrates a schematic diagram of an exemplary turn bar component depicting a manipulation of a substrate around the exemplary turn bar component according to this disclosure.

FIG. 1 illustrates a schematic diagram 100 of an exemplary turn bar component 120 depicting a manipulation of a substrate 110 around the exemplary turn bar component 120 according to this disclosure. As shown in FIG. 1, the substrate 110 may be directed along a media transport path in direction A toward a non-rotating turn bar 120 having a slidable surface 125 about which the substrate 110 may be turned. As depicted, a first side 112 of substrate 110 will be in a face up position approaching the turn bar 120. As the substrate 110 is manipulated about the turn bar 120, the substrate 110 is caused to change to a second media transport path direction B, which is substantially 90° with respect to direction A. The substrate, proceeding in direction B, has a second side 114 now in a face up position departing the turn bar 120. Arrangements of a multiplicity of turn bars or other inverters in the overall image receiving media transport path from the image receiving media source to the input of a marking engine may provide a capacity by which to control which side of the image receiving media substrate is shown face up at the input to the marking engine. Regardless, however, as is shown in FIG. 1, the leading edge of the substrate as it travels along the transport path does not change.

Figure 2:
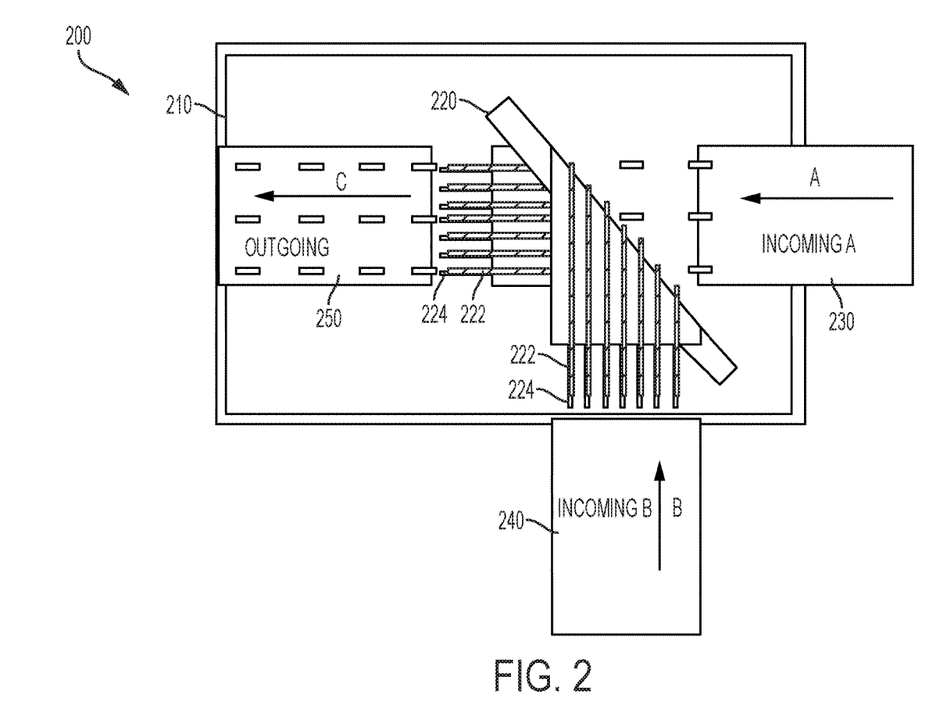
FIG. 2 illustrates a schematic diagram of a top plan view of a first exemplary embodiment of media sheet router according to this disclosure.

FIG. 2 illustrates a schematic diagram 200 of a top plan view of a first exemplary embodiment of media sheet router 210 according to this disclosure. As shown in FIG. 2, the media sheet router 210 may provide an opportunity by which input sheets may be routed from, or along, different axes to be commonly presented to an output of the media sheet router 210 which may be coupled to an input of a media marking engine. Media sheet router 210 may provide an opportunity for an in-line input of an incoming sheet A of image receiving media substrate 230 to proceed substantially along an in-line path from a media source, through the media sheet router 210. In embodiments, the incoming sheet A of image receiving media substrate 230 may translate from the media source, along an image receiving media transport path in direction A as indicated, substantially bypass the intervening apparatus, which will be discussed in detail below, to be presented as the outgoing sheet of image receiving media substrate 250 exiting the media sheet router 210 in direction C to an input of the media marking engine, direction C being substantially parallel to, and in line with, direction A.

Separately, an offset media transport path may be provided by which an incoming sheet B of image receiving media substrate 240 to proceed substantially along an articulated path from a media source, through the media sheet router 210. In embodiments, the incoming sheet B of image receiving media substrate 240 may translate from the media source, along an image receiving media transport path in direction B as indicated. The incoming sheet B of image receiving media substrate 240 may be contacted by upper guide structures 222 and/or lower guide structures 224 that may sandwich the incoming sheet B of image receiving media substrate 240 for presentation to, and around, turn bar 220. In embodiments, the upper guide structures 222 and the lower guide structures 224 may be in a form of guide belts that effectively sandwich the incoming sheet B of image receiving media substrate 240 for the translation of the incoming sheet B of image receiving media substrate 240 around the turn bar 220 substantially in the manner shown, in detail, in FIG. 1. As illustrated, the incoming sheet B of image receiving media substrate 240 may be manipulated around the turn bar 220 and be presented as the outgoing sheet of image receiving media substrate 250 exiting the media sheet router 210 in direction C to an input of the media marking engine, direction C being substantially orthogonal to direction B.

Figure 3:
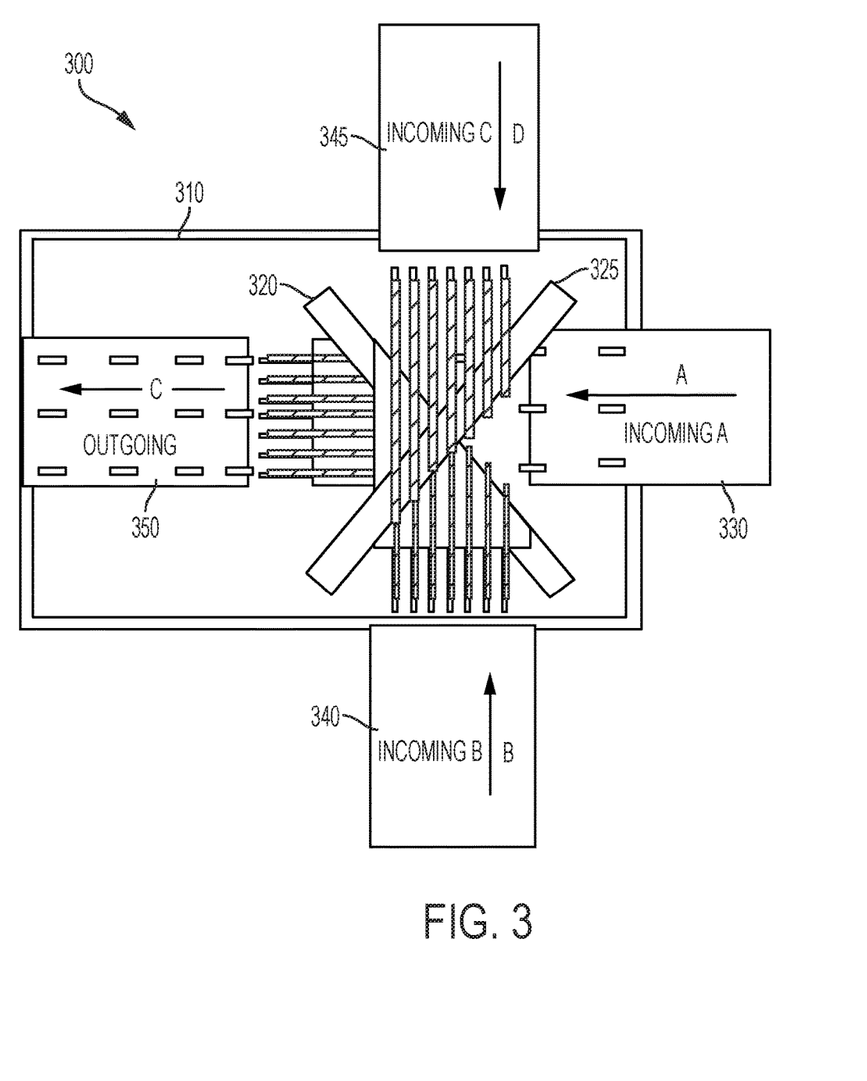
FIG. 3 illustrates a schematic diagram of a top plan view of a second exemplary embodiment of media sheet router according to this disclosure.

FIG. 3 illustrates a schematic diagram 300 of a top plan view of a second exemplary embodiment of media sheet router 310 according to this disclosure. As shown in FIG. 3, the media sheet router 310 may provide an opportunity by which additional input sheets may be routed from, or along, additional different axes/paths to be commonly presented to an output of the media sheet router 310 which may be coupled to an input of a media marking engine. Media sheet router 310 may, in like manner to that shown in FIG. 2, provide an opportunity for an in-line input of an incoming sheet A of image receiving media substrate 330 to proceed substantially along an in-line path in direction A from a media source, through the media sheet router 310, to be presented as the outgoing sheet of image receiving media substrate 350 exiting the media sheet router 310 in direction C to an input of the media marking engine.

Separately, multiple offset media transport paths may be provided through the media sheet router 310. First, an incoming sheet B of image receiving media substrate 340 may be made to proceed substantially along an articulated path from a media source, through the media sheet router 310. In embodiments, the incoming sheet B of image receiving media substrate 340 may translate from the media source, along an image receiving media transport path in direction B as indicated. The incoming sheet B of image receiving media substrate 340 may be contacted by upper and/or lower guide structures (left unnumbered in the illustration shown in FIG. 3 to reduce clutter in the image) that may sandwich the incoming sheet of image receiving media substrate 340 for presentation to, and around, a first turn bar 320. As in the embodiment shown in FIG. 2, it should be noted that the upper and/or lower guide structures may be in a form of guide belts that effectively sandwich the incoming sheet B of image receiving media substrate 340 for the translation of the incoming sheet B of image receiving media substrate 340 around the turn bar 320 substantially in the manner shown, in detail, in FIG. 1. As illustrated, the incoming sheet B of image receiving media substrate 340 may be manipulated around the turn bar 320 and be presented as the outgoing sheet of image receiving media substrate 350 exiting the media sheet router 310 in direction C to an input of the media marking engine, direction C being substantially orthogonal to direction B.

Mirroring the structure described above, an incoming sheet C of image receiving media substrate 345 may be made to proceed substantially along an articulated path from a media source, through the media sheet router 310. In embodiments, the incoming sheet C of image receiving media substrate 345 may translate from the media source, along an image receiving media transport path in direction D as indicated. The incoming sheet C of image receiving media substrate 345 may be contacted by upper and/or lower guide structures (again left unnumbered in the illustration shown in FIG. 3 to reduce clutter in the image) that may sandwich the incoming sheet of image receiving media substrate 340 for presentation to, and around, a second turn bar 325, with all the detail described above with respect to the transport path of incoming sheet B of image receiving media 340. The incoming sheet C of image receiving media substrate 345 may be manipulated around the turn bar 325 and be presented as the outgoing sheet of image receiving media substrate 350 exiting the media sheet router 310 in direction C to an input of the media marking engine, direction C being substantially orthogonal to direction D, and substantially in line with, and opposite to direction B. it should be noted, however, that the transport paths for incoming sheet B of image receiving media 340 and incoming sheet C of image receiving media 345 need not be aligned with one another. These paths and the respective turn bars maybe laterally offset with respect to each other while keeping the output of the manipulated sheet with the in-line media path shown.

Figure 4:
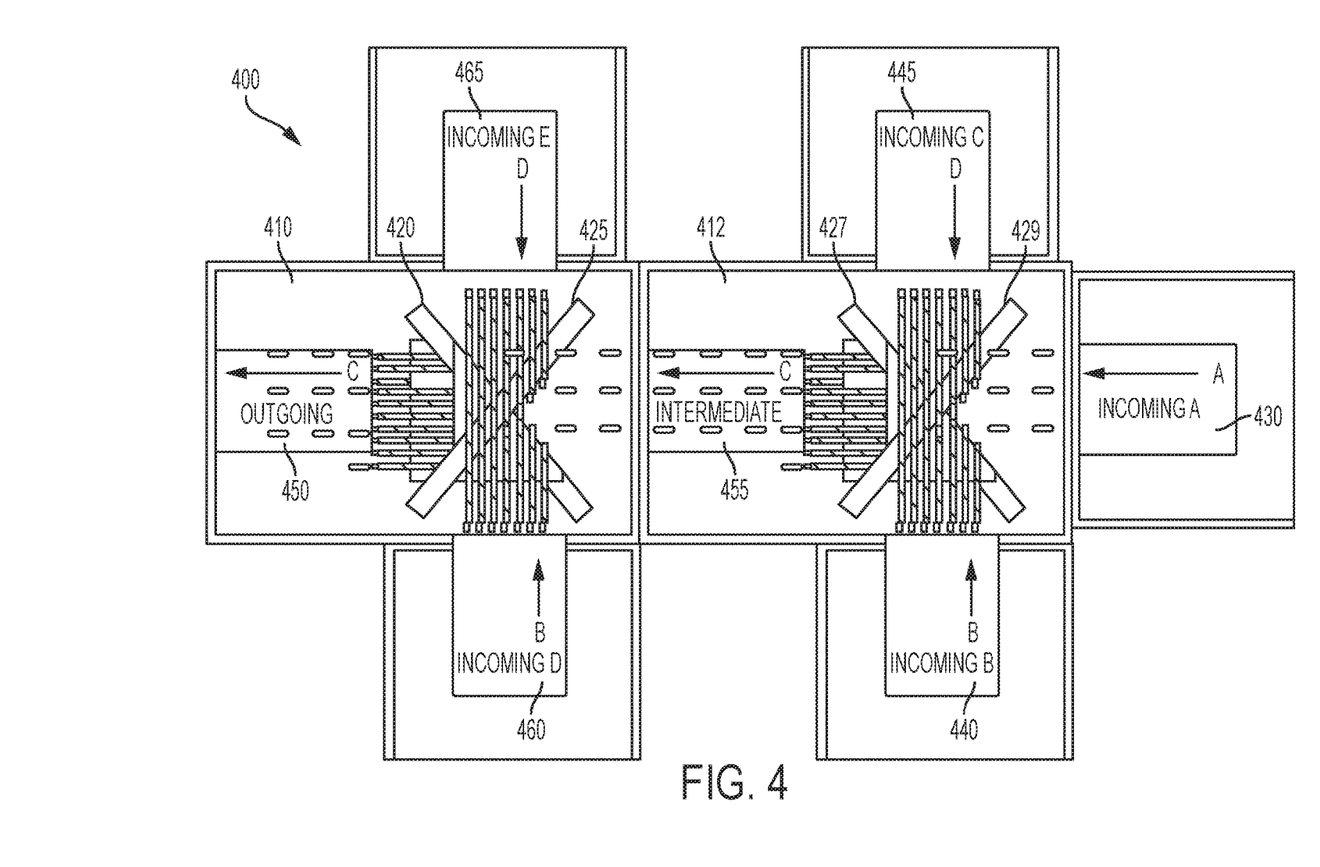
FIG. 4 illustrates a schematic diagram of a top plan view of a third exemplary embodiment of media sheet router according to this disclosure.

FIG. 4 illustrates a schematic diagram 400 of a top plan view of a third exemplary embodiment of media sheet router according to this disclosure. The depiction in FIG. 4 may be more correctly described as depicting a plurality of media sheet routers 410/412 according to this disclosure substantially aligned with each other to provide a single in-line media transport path from a presentation of incoming sheet A of image receiving media substrate 430 proceeding substantially along an in-line path in direction A from a media source, through the media sheet router 412, to be presented as the intermediate sheet of image receiving media substrate 455 exiting the media sheet router 412 in direction C to an input of the second media sheet router 410 proceeding substantially linearly through the second media sheet router 410 to arrive as outgoing sheet of image receiving media 450 for presentation to an input of the media marking engine.

The multiple media sheet routers 410,412 may be configured as either of the media sheet routers shown in FIGS. 2 and 3. In the depiction shown in FIG. 4, a combination of multi-axis sheet routers such as those shown in FIG. 3 are depicted as linked together. In this manner, separate multiple offset media transport paths may be provided to include the following paths.

An incoming sheet B of image receiving media substrate 440 may be made to proceed substantially along an articulated path from a media source along a first portion of an image receiving media transport path in direction B in a first media sheet router 412 as indicated and around a first turn bar 427 to be presented as the intermediate sheet of image receiving media substrate 455 exiting the first media sheet router 412 in direction C to an input of the second media sheet router 410.

An incoming sheet C of image receiving media substrate 445 may be made to proceed substantially along an articulated path from a media source along a first portion of an image receiving media transport path in direction D in the first media sheet router 412 as indicated and around a second turn bar 429 to be presented as the intermediate sheet of image receiving media substrate 455 exiting the first media sheet router 412 in direction C to an input of the second media sheet router 410.

In either of the above instances, it is anticipated that the intermediate sheet of image receiving media 455 will proceed along an in-line path from an input of the second media sheet router 410 and be presented as the outgoing sheet of image receiving media 450 exiting the second media sheet router 410 to an input of the marking engine.

An incoming sheet D of image receiving media substrate 460 may be made to proceed substantially along an articulated path from a media source along a first portion of an image receiving media transport path in direction B in the second media sheet router 410 as indicated and around a third turn bar 420 to be presented as the outgoing sheet of image receiving media substrate 450 exiting the second media sheet router 410 in direction C to an input of the media marking engine.

Finally, an incoming sheet E of image receiving media substrate 465 may be made to proceed substantially along an articulated path from a media source along a first portion of an image receiving media transport path in direction D in the second media sheet router 410 as indicated and around a fourth turn bar 425 to be presented as the outgoing sheet of image receiving media substrate 450 exiting the second media sheet router 410 in direction C to an input of the media marking engine.

Figure 5:
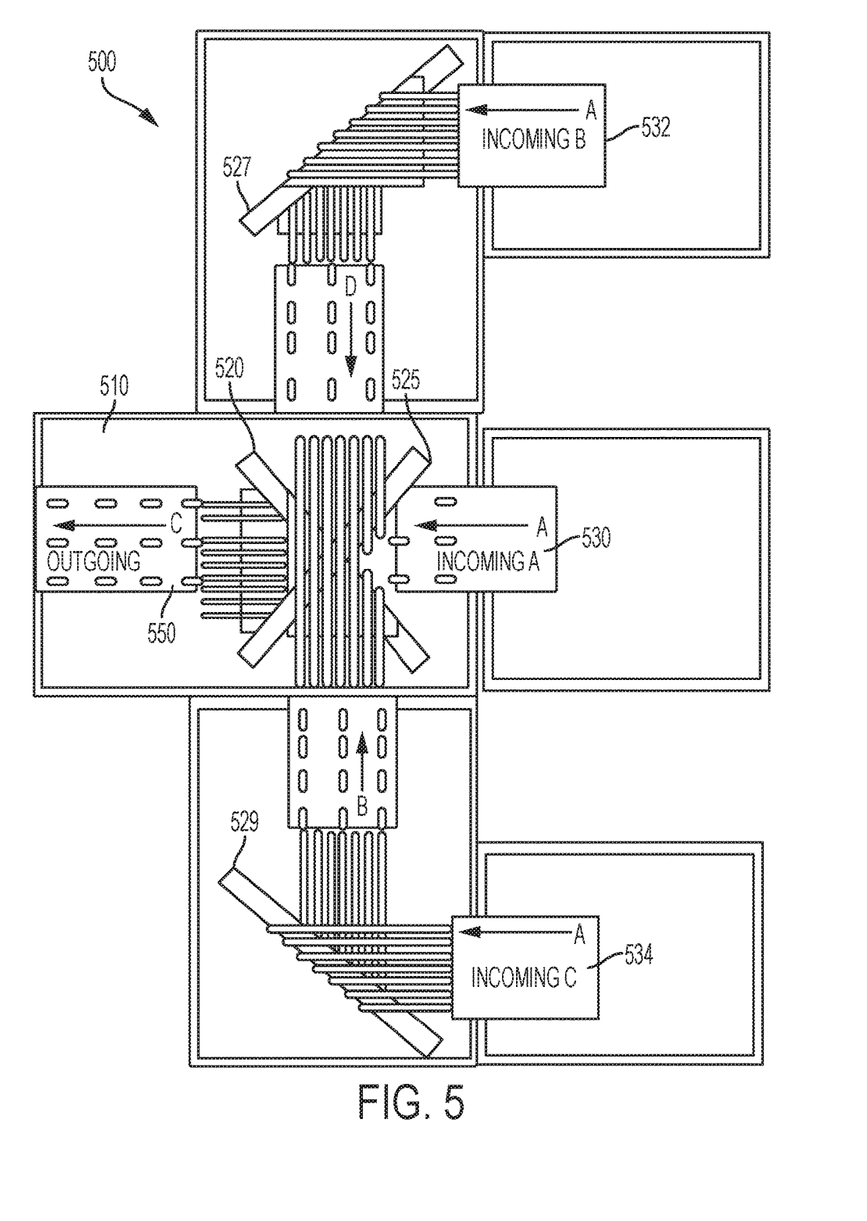
FIG. 5 illustrates a schematic diagram of a top plan view of a fourth exemplary embodiment of media sheet router according to this disclosure.

FIG. 5 illustrates a schematic diagram 500 of a top plan view of a fourth exemplary embodiment of media sheet router 510 according to this disclosure. As shown in FIG. 5, the media sheet router 510 may provide an opportunity by which to align multiple sources of input image receiving media as one or more of a stacked feeder, a pallet feeders, and/or a roll feed. Input sheets of image receiving media may be routed from, or along, different axes to be commonly presented to an output of the media sheet router 510, which may be coupled to an input of a media marking engine, in a variation of the schemes described above. Media sheet router 510 may provide an opportunity for an in-line input of an incoming sheet A of image receiving media substrate 530 to proceed substantially along an in-line path from a media source, through the media sheet router 510. In embodiments of the variation shown in FIG. 5, the incoming sheet A of image receiving media substrate 530 may translate from the media source, along an image receiving media transport path in direction A as indicated, substantially bypassing all intervening apparatus to be presented as the outgoing sheet of image receiving media substrate 550 exiting the media sheet router 510 in direction C to an input of the media marking engine.

A second and offset media transport path may be provided by which an incoming sheet B of image receiving media substrate 532 may be made to proceed substantially along an articulated path from a media source, through the media sheet router 510. In embodiments, the articulated path may be more complex as the incoming sheet B of image receiving media substrate 532 may translate from the media source, along a first portion of an image receiving media transport path in direction A, parallel to the in-line transport path, as indicated. The incoming sheet B of image receiving media substrate 532 may be transported to, and around, turn bar 527 to be output in intermediate direction D along a second portion of the image receiving media transport path, as shown. The incoming sheet B of image receiving media substrate 532 may then be transported further to and around the turn bar 525 to be output as the outgoing sheet of image receiving media 550 in direction C exiting the media sheet router 510.

A third and also offset media transport path may be provided by which an incoming sheet C of image receiving media substrate 534 may be made to proceed substantially along an articulated path from a media source, through the media sheet router 510. In embodiments, the articulated path may mirror the more complex media transport path described above with respect to incoming sheet B of image receiving media substrate 532. The incoming sheet C of image receiving media 534 may be made to translate from the media source, along a first portion of this third image receiving media transport path in direction A, parallel to the in-line transport path, as indicated. The incoming sheet C of image receiving media substrate 534 may be transported to, and around, turn bar 529 to be output in intermediate direction B along a second portion of the image receiving media transport path as shown. The incoming sheet C of image receiving media substrate 534 may then be transported further to and around the turn bar 520 to be output as the outgoing sheet of image receiving media 550 in direction C exiting the media sheet router 510.

The above schemes represent only examples of how mixed in-line and multiple articulated media transport paths may be provided according to configurations of media sheet routers to translate sheets of input image receiving media, in multiple forms, and from multiple sources that may generally be considered exclusively incompatible with one another in conventionally-available configurations, from media sources through the media sheet routers to a common input of a media marking engine. Those of skill in the art will recognize that, given the guidance provided above in the disclosed schemes, many and widely-varied opportunities of providing multi-source media sheet routers in varying configurations are available.

Figure 6:
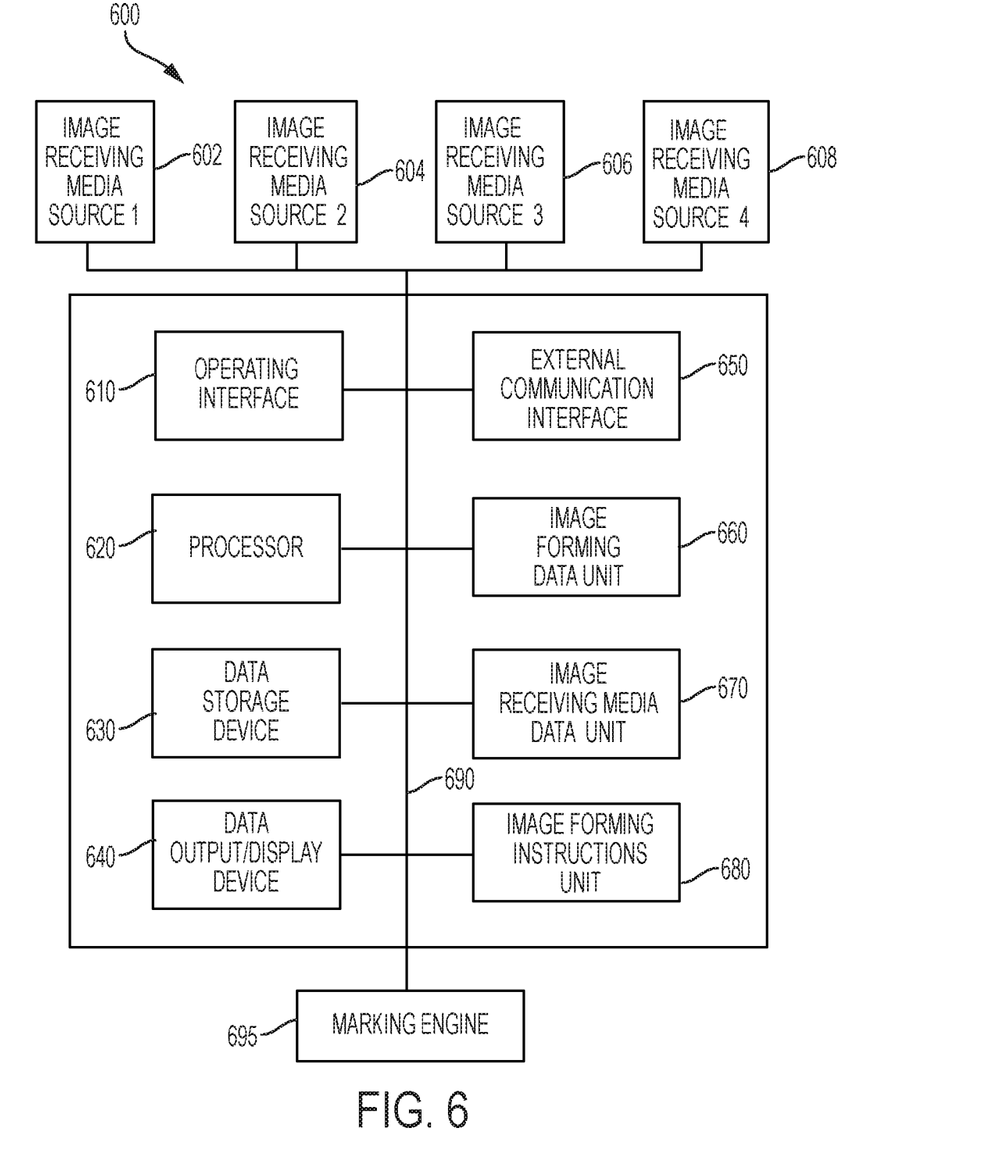
FIG. 6 illustrates a block diagram of an exemplary control system for implementing a multi-feeder sheet selection scheme for selecting among varying image receiving media substrates for input to a marking engine according to this disclosure.

FIG. 6 illustrates a block diagram of an exemplary control system 600 for implementing a multi-feeder sheet selection scheme for selecting among varying image receiving media substrates for input to a marking engine 695 according to this disclosure. The exemplary control system 600 may provide an opportunity to individually control multiple image receiving media sources (1-4) 602,604,606,608 (and more as appropriate), which may include a combination of stacked image receiving media feeders, image receiving media feeder bypasses, pallet image receiving media feeders, and/or rolled media image receiving media feeders (including sheeters), to provide one or more types of image receiving media substrates to an input of a marking engine 695.

The exemplary control system 600 may include an operating interface 610 by which a user may communicate with the exemplary control system 600. The operating interface 610 may be a locally-accessible user interface associated with an image forming device with which the multiple image receiving media sources 602-608 and the media marking engine 695 may be also associated. The operating interface 610 may be configured as one or more conventional mechanisms common to control devices, computing devices and/or media marking devices that may permit a user locally, or remotely, to input information to the exemplary control system 600 for the conduct of a particular print job in the image forming device. The operating interface 610 may include, for example, a conventional keyboard, a touchscreen with "soft" buttons or with various components for use with a compatible stylus, a microphone by which a user may provide oral commands to the exemplary control system 600 to be "translated" by a voice recognition program, or other like device by which a user may communicate specific operating instructions to the exemplary control system 600. The operating interface 610 may be a part or a function of a graphical user interface (GUI) mounted on, integral to, or associated with, the image forming device with which the exemplary control system 600 is associated.

The exemplary control system 600 may include one or more local processors 620 for individually operating the exemplary control system 600 and for carrying into effect control and operating functions for the multi-feed transport of selectable image receiving media substrates from the multiple image receiving media sources 602-608 to the marking engine 695. Processor(s) 620 may include at least one conventional processor or microprocessor that interprets and executes instructions to direct specific functioning of the exemplary control system 600, and control the selectable flow of image receiving media in the image forming device with which the exemplary control system 600 is associated.

The exemplary control system 600 may include one or more data storage devices 630. Such data storage device(s) 630 may be used to store data or operating programs to be used by the exemplary control system 600, and specifically the processor(s) 620. Data storage device(s) 630 may be used to store information regarding, for example, the types of image receiving media sources that may be indicated as image receiving media sources (1-4) 602-608, and additionally, which specific forms of image receiving media may be provided in each of the image receiving media sources (1-4) 602-608. In this manner, the processors 620, or other components of the exemplary control system 600, may individually select media from one or more of the image receiving media sources (1-4) 602-608 in executing the print job via the marking engine 695.

The data storage device(s) 630 may include a random access memory (RAM) or another type of dynamic storage device that is capable of storing updatable database information, and for separately storing instructions for execution of system operations by, for example, processor(s) 620. Data storage device(s) 630 may also include a read-only memory (ROM), which may include a conventional ROM device or another type of static storage device that stores static information and instructions for processor(s) 620. Further, the data storage device(s) 630 may be integral to the exemplary control system 600, or may be provided external to, and in wired or wireless communication with, the exemplary control system 600, including as cloud-based data storage components.

The exemplary control system 600 may include at least one data output/display device 640, which may be configured as one or more conventional mechanism that output information to a user, including, but not limited to, a display screen on a GUI of an image forming device with which the exemplary control system 600 may be associated. The data output/display device 640 may be used to indicate to a user a status of a print job, and/or to indicate an availability of one or more types of image receiving media substrate in support of image forming operations controlled by the exemplary control system 600. Separately, the data output/display device 640 may display other information with regard to any image forming operation effected by the device with which the exemplary control system 600 may be associated including an operation of one or more individual image receiving media sources (1-4) 602-608.

The exemplary control system 600 may include one or more separate external communication interfaces 650 by which the exemplary control system 600 may communicate, as necessary, with components external to the exemplary control system 600. At least one of the external communication interfaces 650 may be configured as an input port to support connection to an external computer or word processor that may direct a print job or other image forming operation in the image forming device with which the exemplary control system 600 may be associated. Any suitable data connection to provide wired or wireless communication between the exemplary control system 600 and external and/or associated components is contemplated to be encompassed by the depicted external communication interface 650.

The exemplary control system 600 may include an image forming data unit 660 that may be used to accept, and translate, image forming data from an external source in a conventional manner often employed by image forming devices. The image forming data unit 660 may operate as a part or a function of the processor 620 coupled to one or more of the data storage devices 630, or may operate as a separate stand-alone component module or circuit in the exemplary control system 600. Either of the processor 620 or the image forming data unit 660 may accept for execution image forming data or information from an image forming data source and execute an image forming operation according to the image forming data or information received.

The exemplary control system 600 may include an image receiving media data unit 670 as a part or a function of the processor 620 coupled to one or more of the data storage devices 630, or as a separate stand-alone component module or circuit in the exemplary control system 600. The image receiving media data unit 670 may be usable to catalog and control the selection among the differing image receiving media currently available to the image forming device according to which media may be loaded in any one or more of image receiving media sources (1-4) 602-608. The image receiving media data unit 670 may include information regarding how many manipulations may occur with regard to a particular sheet of input image receiving media as it translates via an individual image receiving media transport path from one or more of the image receiving media sources (1-4) 602-608 in order to ensure proper presentation of the individual sheets of image receiving media to an input of the marking engine 695 for proper image forming thereon.

The exemplary control system 600 may include an image forming instructions unit 680. As with the above-enumerated other separate control units, the image forming instructions unit 680 may operate as a part or a function of the processor 620 coupled to one or more data storage devices 630 for executing the precise image forming functions on the selected image receiving media substrates in the marking engine 695.

All of the various components of the exemplary control system 600, as depicted in FIG. 6, may be connected internally, and to one or more image forming devices, marking engines 695 and/or image receiving media sources (1-4) 602-608 by one or more data/control busses 690. These data/control busses 690 may provide wired or wireless communication between the various components of the exemplary control system 600, whether all of those components are housed integrally in, or are otherwise external and connected to an image forming device with which the exemplary control system 400 may be associated.

It should be appreciated that, although depicted in FIG. 6 as a substantially an integral unit, the various disclosed elements of the exemplary control system 600 may be arranged in any combination of sub-systems as individual components or combinations of components, integral to a single unit, or external to, and in wired or wireless communication with the single unit of the exemplary control system 600. In other words, no specific configuration as an integral unit or as a support unit is to be implied by the depiction in FIG. 6. Further, although depicted as individual units for ease of understanding of the details provided in this disclosure regarding the exemplary control system 600, it should be understood that the described functions of any of the individually-depicted components, and particularly each of the depicted control units, may be undertaken, for example, by one or more processors 620 connected to, and in communication with, one or more data storage device(s) 630.

Figure 7:
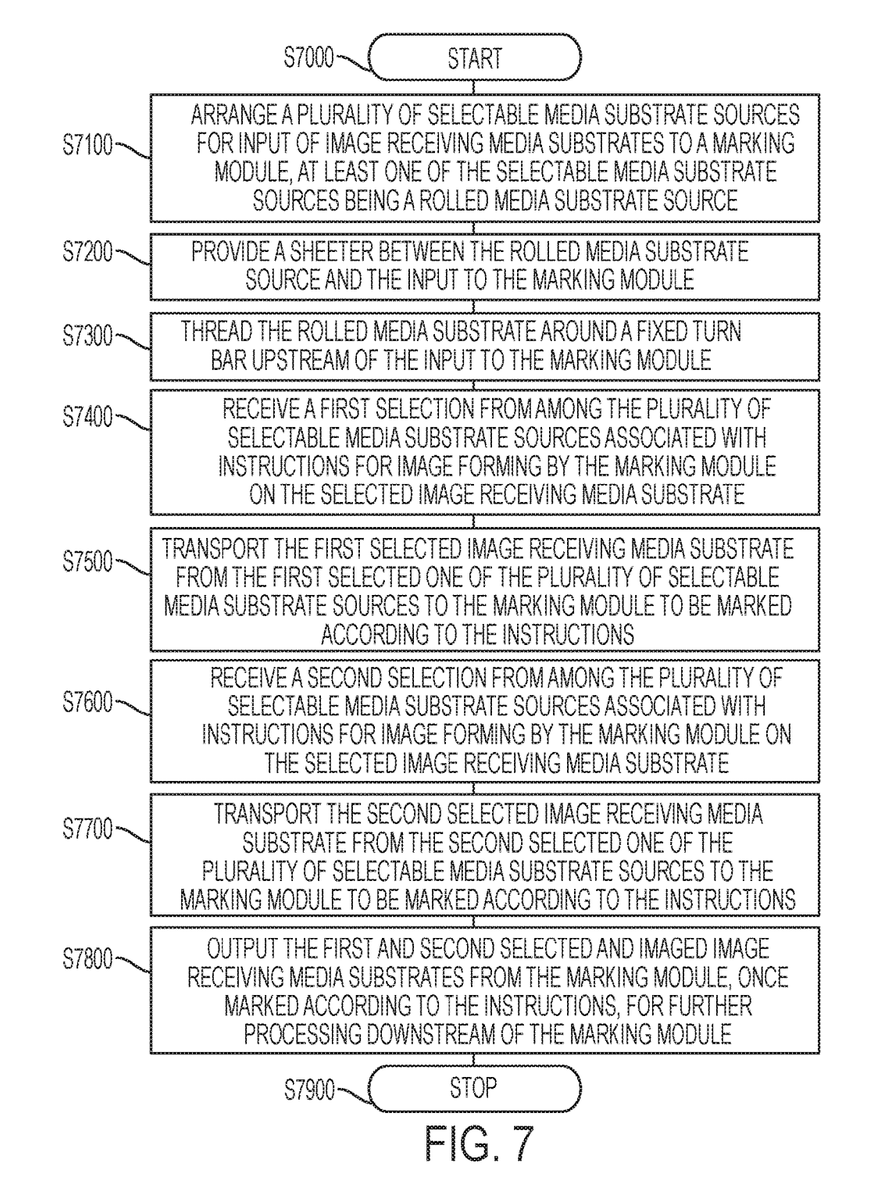
FIG. 7 illustrates a flowchart of an exemplary method for implementing a multi-feeder sheet selection scheme for selecting among varying image receiving media substrates for input to a marking engine according to this disclosure.

The disclosed embodiments may include an exemplary method for implementing a multi-feeder sheet selection scheme for selecting among varying image receiving media substrates for input to a marking engine. FIG. 7 illustrates a flowchart of such an exemplary method. As shown in FIG. 7, operation of the method commences at Step S7000 and proceeds to Step S7100.

In Step S7100, a plurality of selectable media substrates sources for input of image receiving media substrates to a marking module may be provided. At least one of the selectable media substrates sources may include accommodation for the rolled media. Operation of the method proceeds to Step S7200.

In Step S7200, a sheeter may be provided between the rolled media substrates source and the input to the marking module. Operation of the method proceeds to Step S7300.

In Step S7300, sheeted rolled media, or otherwise she did media, may be threaded around a fixed turn bar positioned upstream of an input to the marking module in order to provide an opportunity to input separate she did media into an input image receiving media transport path from an orthogonal position as generally depicted in any one of FIGS. 2-5. Operation of the method proceeds to Step S7400.

In Step S7400, a first selection from among the plurality of selectable media substrate sources may be received. This first selection may be associated with instructions for image forming by the marking module on the selected image receiving media substrates. Operation of the method proceeds to Step S7500.

In Step S7500, the first selected image receiving media substrate may be transported from the first selected one of the plurality of selectable media substrates sources to the marking module to be marked according to the instructions. Operation of the method proceeds to Step S7600.

In Step S7600, even within the context of a same print job, or for a separate print job, a second selection from among a plurality of selectable media substrate sources may be received. This second selection may be associated with instructions for image forming by the marking module on the selected image receiving media substrates as a separate portion of the print job, or to be interleaved in among the first selection from among a plurality of selectable media substrate sources. Operation of the method proceeds to Step S7700.

In Step S7700, the second selected image receiving media substrate may be transported from the second selected one of the plurality of selectable media substrate sources to the marking module to be marked according to the instructions. Operation of the method proceeds to Step S7800.

In Step S7800, the first and second selected and imaged image receiving media substrates may be output from the marking module, once marked according to the instructions for further processing downstream of the marking module. Any further processing may be according to known techniques for fusing, finishing, collating, binding or other like processing techniques. Operation of the method proceeds to Step S7900, where operation of the method ceases.

The disclosed embodiments may include a non-transitory computer-readable medium storing instructions which, when executed by a processor, may cause the processor to execute all, or at least some, of the steps of the methods outlined above.

The above-described exemplary systems and methods reference certain conventional components to provide a brief, general description of image forming operations and devices in which the subject matter of this disclosure may be implemented for familiarity and ease of understanding. Although not required, embodiments of the disclosure may be provided, at least in part, in a form of hardware circuits, firmware, or software computer-executable instructions to carry out the specific functions described. These may include individual program modules executed by processors.

In embodiments, constant velocity cut sheet routing system using a belt and 45° stationary cylindrical rolls capable of feeding from multiple upstream feeders to a single marking engine, printer or other downstream system. A cut-sheet routing system for high speed printers that delivers cut sheet media from multiple feeders on the fly on a sheet-to-sheet basis while maintaining sheet orientation (portrait or landscape). Expandable and configurable systems are provided that may allow unlimited inputs by coupling several units together in different configurations. No acceleration or deceleration profiles are required to route cut sheets between multiple upstream and a downstream printing module. No reciprocating or stop start motions are required to align sheets from the input direction to the output direction eliminating issues with inertia, intercopy gap and higher PPM rates. The disclosed schemes substantially eliminate issues with intercopy gap timing that is associated with systems that need to handle the incoming sheet with the same system that is directing the outgoing sheet. This allows the system to direct each sheet on a sheet-by-sheet basis from different upstream systems at high speed. The disclosed systems are expandable and configurable to handle any number of feeders and are capable of being laid out to accommodate restricted floor plans. In embodiments, an ability is provided to fit with only one way turn for lower cost when both directions are not required, and to allow for retrofit of additional paths if needed later. Substantially, all input and output heights may be set to industry standard heights. Those skilled in the art will appreciate that other embodiments of the disclosed subject matter may be practiced in image-forming systems of many different configurations.

The exemplary depicted sequence of executable instructions or associated data structures for carrying into effect those executable instructions represent one example of a corresponding sequence of acts for implementing the functions described in the steps of the above-outlined exemplary methods. The exemplary depicted steps may be executed in any reasonable order to carry into effect the objectives of the disclosed embodiments. No particular order to the disclosed steps of the methods is necessarily implied by the depiction in FIG. 7, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

I claim:

1. An image receiving media transport module, comprising:
   a first image receiving media substrate source;
   a second image receiving media substrate source;
   a first transport path for transporting image receiving media substrate sheets from the first image receiving media source to a common output;
   a second transport path for transporting image receiving media substrate sheets from the second image receiving media source to the common output,
   an exit portion of the first transport path upstream of the common output in a process direction and an exit portion of the second transport path upstream of the common output in the process direction being coincident;
   at least one of the first transport path and the second transport path including a stationary turn bar arranged at 45° to the process direction upstream of the common output to align the exit portions of the first transport path and second transport path coincidently with one another, the stationary turn bar having an outer surface; and
   at least one guide device separate from and extending around the outer surface of the stationary turn bar and configured to guide the image receiving media substrate sheets circulating around the outer surface of the stationary turn bar, the at least one guide device routed around the stationary turn bar to present the image receiving media substrate sheets around the outer surface of the stationary turn bar, the image receiving media substrate sheets circulating around the outer surface of the stationary turn bar being separate individual substrate sheets having a length, the at least one guide device having a length along the at least one of the first transport path and the second transport path including the stationary turn bar that is greater than the length of the image receiving media substrate sheets.

2. The image receiving media transport module of claim 1, the image receiving media substrate sheets approaching the stationary turn bar with a leading edge of the image receiving media substrate sheets proceeding in a first direction, the image receiving media substrate sheets circulating around the turn bar to exit the turn bar with the same leading edge proceeding in a second direction, the second direction being orthogonal to the first direction.

3. The image receiving media transport module of claim 1, the at least one guide device cooperating with the stationary turn bar to guide the image receiving media toward the stationary turn bar with a leading edge of the image receiving media substrate sheets proceeding in a first direction and to exit guide the image receiving media substrate sheets away from the stationary turn bar with the leading edge proceeding in a second direction, the second direction being orthogonal to the first direction.

4. The image receiving media transport module of claim 1, the at least one guide device being a fixed guide device.

5. The image receiving media transport module of claim 1, the at least one guide device being a belt guide device.

6. The image receiving media transport module of claim 5, the belt guide device being a pair of cooperating conveyor belts configured to sandwich the image receiving media substrate sheets in circulation around the stationary turn bar, one of the pair of cooperating conveyor belts routed around the stationary turn bar and configured to hold the image receiving media substrate sheets between the one conveyor belt and the stationary turn bar.

7. The image receiving media transport module of claim 1, the first image receiving media substrate source being in line with the exit portion of the first transport path making the first transport path an inline transport path from the first image receiving media substrate source to the common output.

8. The image receiving media transport module of claim 7, the second image receiving media substrate source being offset from the exit portion of the second transport path.

9. The image receiving media transport module of claim 8, the second image receiving media substrate source being positioned such that a first portion of the second transport path is orthogonal to the inline transport path, the stationary turn bar being arranged at 45° in the first portion to align a second portion of the second transport path with the inline transport path.

10. The image receiving media transport module of claim 8, the second image receiving media substrate source being positioned such that a first portion of the second transport path is parallel to the inline transport path, a first stationary turn bar being arranged at 45° in the first portion to align a second portion of the second transport path orthogonally to the inline transport path, and a second stationary turn bar being arranged at 45° in the second portion to align a third portion of the second transport path with the inline transport path.

11. The image receiving media transport module of claim 8, further comprising:
    at least a third image receiving media substrate source; and
    at least a third transport path for transporting image receiving media substrate sheets from the third image receiving media substrate source to the common output,
    the third image receiving media substrate source being positioned such that a first portion of the third transport path is orthogonal to the inline transport path, another stationary turn bar being arranged at 45° in the first portion to align a second portion of the third transport path with the inline transport path.

12. The image receiving media transport module of claim 1, each of the first transport path and the second transport path including a stationary turn bar arranged at 45° to the process direction upstream of the common output to align the exit portions of the first transport path and second transport path coincidently with one another.

13. The image receiving media transport module of claim 1, at least one of the first image receiving media substrate source and the second substrate source being a pallet substrate source.

14. A method for transporting image receiving media sheets in an image forming device, comprising:
    providing first image receiving media sheets at a first image receiving media substrate source;
    providing second image receiving media sheets at a second image receiving media substrate source;
    selectively transporting the first image receiving media sheets along a first image receiving media transport path to an input of a marking engine;
    selectively transporting the second image receiving media sheets along a second image receiving media transport path to the input of the marking engine,
    an exit portion of the first transport path upstream of the input to the media marking engine in a process direction and an exit portion of the second transport path upstream of the input to the media marking engine in the process direction being coincident with each other, and
    at least one of the first transport path and the second transport path including a stationary turn bar arranged at 45° to the process direction upstream of the input to the media marking engine to align the exit portions of the first transport path and second transport path coincidently with each other, the stationary turn bar having an outer surface;
    employing at least one guide device adjacent to and extending around the outer surface of the stationary turn bar to guide at least one of the first image receiving media sheets and the second image receiving media sheets circulating around the stationary turn bar, the at least one guide device routed around the stationary turn bar; and
    presenting the at least one of the first image receiving media sheets and the second image receiving media sheets around the outer surface of the stationary turn bar to the input of the marking engine via the at least one guide device routed around the stationary turn bar, the at least one of the first image receiving media sheets and the second image receiving media sheets presented around the outer surface of the stationary turn bar being separate individual media sheets having a length, the at least one guide device having a length along the at least one of the first transport path and the second transport path including the stationary turn bar that is greater than the length of the separate individual media sheets.

15. The method of claim 14, further comprising transporting the image receiving media sheets to the stationary turn bar with a leading edge of the image receiving media sheets proceeding in a first direction, the image receiving media sheets circulating around the turn bar to exit the turn bar with the same leading edge proceeding in a second direction, the second direction being orthogonal to the first direction.

16. The method of claim 14, the at least one guide device comprising a pair of cooperating conveyor belts, one of the pair of cooperating conveyor belts routed around the stationary turn bar and configured to hold the image receiving media sheets between the one conveyor belt and the stationary turn bar,
    the method further comprising sandwiching the image receiving media sheets in circulation around the stationary turn bar between the pair of cooperating belts, with the one cooperating conveyor belt holding the image receiving media sheets between the one cooperating conveyor belt and the stationary turn bar.

17. The method of claim 14, the first image receiving media substrate source being in line with the exit portion of the first transport path making the first transport path an inline transport path from the first image receiving media substrate source to the common output.

18. The method of claim 17, the second image receiving media substrate source being positioned such that a first portion of the second transport path is orthogonal to the inline transport path, the stationary turn bar being arranged at 45° in the first portion to align a second portion of the second transport path with the inline transport path.

19. The method of claim 18, further comprising:
providing at least a third image receiving media substrate source, the image receiving media transport module including at least a third transport path for transporting image receiving media sheets from the third image receiving media substrate source to the common output; and
selectively transporting third image receiving media from the third image receiving media substrate source,
the third image receiving media source being positioned such that a first portion of the third transport path is orthogonal to the inline transport path, another stationary turn bar being arranged at 45° in the first portion to align a second portion of the third transport path with the inline transport path.

20. An image forming device, comprising:
a first image receiving media substrate source;
a second image receiving media substrate source;
a marking module that deposits marking material on image receiving media substrate sheets; and
an image receiving media transport module, including:
  a common output aligned with an input of the marking module;
  a first transport path for transporting the image receiving media substrate sheets from the first image receiving media source to the common output;
  a second transport path for transporting the image receiving media substrate sheets from the second image receiving media source to the common output, an exit portion of the first transport path upstream of the common output in a process direction and an exit portion of the second transport path upstream of the common output in the process direction being coincident, and
  at least one of the first transport path and the second transport path including a stationary turn bar arranged at 45° to the process direction upstream of the common output to align the exit portions of the first transport path and second transport path coincidently with one another, the stationary turn bar having an outer surface; and
  at least one guide device separate from and extending around the outer surface of the stationary turn bar and configured to guide the image receiving media substrate sheets circulating around the outer surface of the stationary turn bar, the at least one guide device routed around the stationary turn bar to present the image receiving media substrate sheets around the outer surface of the stationary turn bar, the image receiving media substrate sheets circulating around the outer surface of the stationary turn bar being separate individual substrate sheets having a length, the at least one guide device having a length along the at least one of the first transport path and the second transport path including the stationary turn bar that is greater than the length of the image receiving media substrate sheets.

21. The image forming device of claim 20, the at least one guide device being a belt guide device, the belt guide device being a pair of cooperating conveyor belts configured to sandwich the image receiving media substrate sheets in circulation around the stationary turn bar, one of the pair of cooperating conveyor belts routed around the stationary turn bar and configured to hold the image receiving media substrate sheets between the one conveyor belt and the stationary turn bar.

* * * * *